US012576815B2

(12) United States Patent
Müller et al.

(10) Patent No.: US 12,576,815 B2
(45) Date of Patent: Mar. 17, 2026

(54) DISTRIBUTION DEVICE, LIQUID DISTRIBUTION ACTUATOR, CLEANING DEVICE, VEHICLE AND METHOD OF OPERATING A CLEANING DEVICE

(71) Applicant: Vitesco Technologies GmbH, Regensburg (DE)

(72) Inventors: Marius Müller, Darmstadt (DE); Georges Maguin, Marly (FR); Konstantin Bart, Bad Nauheim (DE); Christof Heeger, Gelnhausen (DE)

(73) Assignee: Vitesco Technologies GmbH, Regensburg (DE)

( * ) Notice: Subject to any disclaimer, the term of this patent is extended or adjusted under 35 U.S.C. 154(b) by 57 days.

(21) Appl. No.: 18/606,075

(22) Filed: Mar. 15, 2024

(65) Prior Publication Data

US 2024/0300450 A1      Sep. 12, 2024

Related U.S. Application Data

(63) Continuation of application No. PCT/EP2022/075050, filed on Sep. 9, 2022.

(30) Foreign Application Priority Data

Sep. 29, 2021      (DE) ..................... 10 2021 210 900.4

(51) Int. Cl.
*B60S 1/48* (2006.01)
*B08B 3/02* (2006.01)

(52) U.S. Cl.
CPC ................ *B60S 1/481* (2013.01); *B08B 3/02* (2013.01)

(58) Field of Classification Search
None
See application file for complete search history.

(56) References Cited

U.S. PATENT DOCUMENTS

2018/0335152 A1    11/2018  Doi

FOREIGN PATENT DOCUMENTS

DE          3840621 A1      6/1990
DE          19718451 A1    11/1998
(Continued)

OTHER PUBLICATIONS

DE102016218331 English translation, accessed on Jul. 2025. (Year: 2018).*

(Continued)

*Primary Examiner* — Kaj K Olsen
*Assistant Examiner* — Arlyn I Rivera-Cordero

(57) ABSTRACT

A distributing device for supplying pressurized liquid to individual cleaning locations of a vehicle is proposed, the distributing device defining individual positions into which a distributor is selectively adjustable relative to a housing in which the distributor is arranged and driveable. Here, the individual positions of the distributor include a multiplicity of distributing positions and a bypass position and a shut-off position. In the bypass position, the distributor forms a bypass for preventing a discharge of the liquid to one of the cleaning locations and for returning the liquid to a tank. By contrast, in the shut-off position, the distributor prevents both the discharge and the return. Also proposed are a liquid-distributing actuator, a cleaning device, a vehicle, and a method for operating the cleaning device.

13 Claims, 1 Drawing Sheet

(56) References Cited

FOREIGN PATENT DOCUMENTS

| | | | | |
|---|---|---|---|---|
| DE | 102016218331 A1 | 3/2018 | | |
| DE | 102016120641 A1 | 5/2018 | | |
| DE | 102019004137 A1 | 12/2020 | | |
| DE | 102020202570 A1 | 9/2021 | | |
| DE | 102020202571 A1 | 9/2021 | | |
| DE | 102021208930 A1 | 11/2022 | | |
| DE | 112016005328 B4 | 4/2023 | | |
| EP | 3153361 A1 | 4/2017 | | |
| FR | 2947606 A1 * | 1/2011 | .......... | F16K 31/041 |

OTHER PUBLICATIONS

DE102020202570 English translation, accessed on Jul. 2025. (Year: 2021).*
FR2947606 English translation, accessed on Jul. 2025. (Year: 2011).*
Holmes, Freddie; Poised and Prepared: Proactive Sensor Cleaning is a Must; https://www.automotiveworld.com/articles/poised-and-prepared-proactive-sensor-cleaning-is-a-must/;Sep. 17, 2019, pp. 4.
Cassel, Anders, et al; On Perception Safety Requirements and Multi Sensor Systems for Automated Driving Systems;https://www.sae.org/publications/technical-papers/content/2020-01-0101/; Apr. 14, 2020; pp. 1.
Baker-Campbell, Andrew; Sensor Cleaning Tech: How Engineers Protect Sensors from Bugs, Bird Droppings, Dirt & Grime; 2021, pp. 11.

* cited by examiner

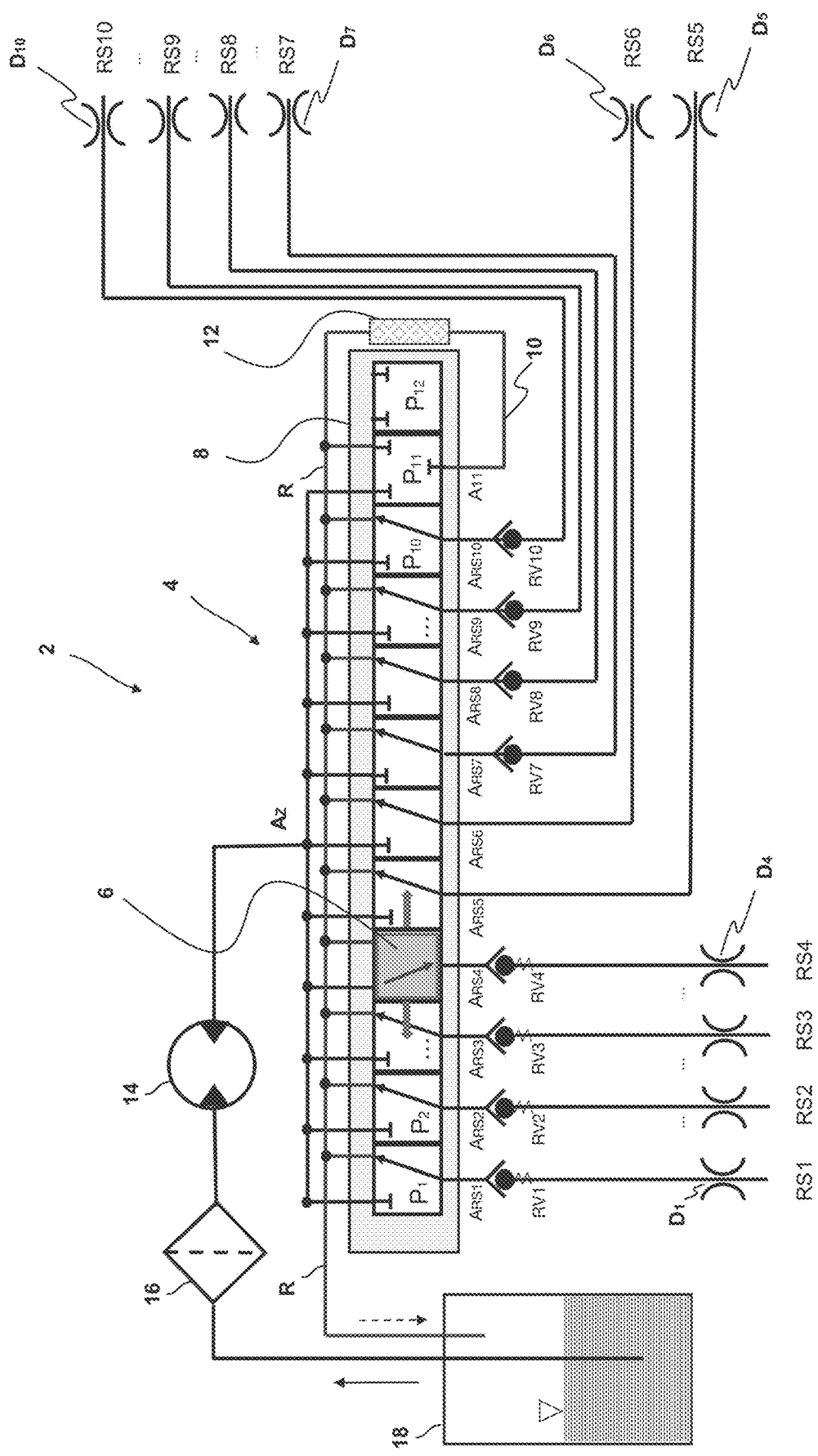

DISTRIBUTION DEVICE, LIQUID DISTRIBUTION ACTUATOR, CLEANING DEVICE, VEHICLE AND METHOD OF OPERATING A CLEANING DEVICE

CROSS-REFERENCE TO RELATED APPLICATIONS

This application claims priority to PCT Application PCT/EP2022/075050, filed Sep. 9, 2022, which claims priority to German Patent Application No. DE 10 2021 210 900.4, filed Sep. 29, 2021. The disclosures of the above applications are incorporated herein by reference.

FIELD OF THE INVENTION

The invention relates to a distributing device for a liquid-distributing actuator, to a liquid-distributing actuator having such a distributing device, to a cleaning device for a vehicle having such a liquid-distributing actuator, to a vehicle having such a cleaning device, and to a method for operating such a cleaning device.

SUMMARY OF THE INVENTION

It is an object of the invention to improve a distribution of water for a vehicle cleaning arrangement, specifically in view of the increasing number of vehicle sensors.

This object is achieved by a distributing device proposed. Also proposed are a liquid-distributing actuator, a cleaning device, a vehicle, and a method for operating the cleaning device.

A distributing device—or distribution device—for supplying pressurized liquid to individual cleaning locations of a vehicle is proposed.

Here, the distributing device defines individual positions into which a distributor is selectively adjustable relative to a housing in which the distributor is arranged and driveable, specifically into:

individual distributing positions, in which the distributor fluidically connects a feed connector, which is subjected to liquid pressure, of the distributing device to one of multiple discharge connectors of the distributing device, a bypass position, in which the distributor forms a bypass for preventing a discharge of the liquid to one of the cleaning locations and for returning the liquid to a tank, out of which the liquid is conveyed, or a shut-off position, which prevents both the discharge and the return.

This proposed water-distributing mechanism simplifies a vehicle cleaning device or a vehicle cleaning system and thus reduces the costs associated therewith, because, by use thereof, it is possible to save on liquid-conveying pumps. There is consequently also an associated weight saving.

Furthermore, this proposed water-distributing mechanism reduces cleaning liquid consumption. This in turn is manifest in an increase in a range of a vehicle that is achieved as such with one filling of a cleaning liquid container or tank. This applies to future fully autonomously driving vehicles which, compared to previous vehicles, may have a significantly higher number of sensors—including safety-relevant sensors—whose functionality must be ensured.

Furthermore, the saving of required device or system components also promotes corresponding compactness of such a device or of such a system, such that overall less installation space is required.

Here, a cleaning location is understood to mean a cleaning location assigned to a vehicle sensor. Here, the cleaning location need not itself be part of the sensor, but may be arranged spaced apart therefrom, for example a location on a windscreen or the like. The cleaning location may however also be part of a vehicle sensor, for example a cleaning location assigned to a camera. A cleaning location may however also be another location on the vehicle which is not associated with a vehicle sensor as such, for example another location on the windshield, a location on a headlight or the like.

Here, in the simplest case, a liquid or cleaning liquid may be understood to mean water, but may be an aqueous cleaning agent solution, that is to say water in conjunction with a cleaning agent additive. Here, the cleaning agent solution may also contain an antifreeze agent, which as such lowers the freezing point of the cleaning agent solution.

It is proposed here that the distributor be configured to be rotatably adjustable or driveable in rotation, and in this case purely rotatably adjustable or driveable purely in rotation.

It is also proposed that the distributor be formed without a seal with respect to the housing. It is proposed here that the distributing device be configured for a liquid return to the tank.

For further illustration of the water-distributing mechanism, of the liquid discharge to the individual cleaning locations and the liquid return to the tank, reference is expressly made at this juncture to the German patent application with the application file reference DE 10 2021 208 930.5, in which the water-distributing mechanism of the distributing device is described in detail in terms of its construction. The water-distributing mechanism described therein, and the distributing device described therein, are hereby also incorporated in the content of disclosure of this description. Reference is made here to the various liquid-receiving and liquid-guiding devices on and/or in the distributor and in the housing of the distributing device, which liquid-receiving and liquid-guiding devices, as such, allow the water distribution, the liquid discharge and the liquid return.

Furthermore, a liquid-distributing actuator is proposed which includes a distributing device or distribution device of the type described above and an electric motor for driving the distributor—such as a rotatable or rotatably adjustable distributor—of the distributing device.

Here, the actuator may furthermore include a control unit, as an integral constituent part within a housing section of the actuator, for activating at least the electric motor.

Here, the control unit may be arranged at the electrical-connection-side end of the actuator. It is proposed here to arrange the control unit and the electric motor in a common housing section of the actuator.

Here, the control unit may furthermore be designed for controlling an associated liquid-conveying pump, which as such is fluidically connected to the actuator.

Also proposed is a cleaning device or a cleaning system for a vehicle for cleaning a multiplicity of cleaning locations on the vehicle, the cleaning device or the cleaning system comprising at least one liquid-distributing actuator of the type described above.

In addition, a vehicle with a cleaning device of the type described above is also proposed.

Here, a vehicle is to be understood to mean any type of vehicle that is operated either with an internal combustion engine and/or with an electric motor, such as passenger motor vehicles and/or utility vehicles. These may be partially autonomously or fully autonomously operated vehicles.

Also proposed is a method for operating the above-described cleaning device.

Here, in order to generate a defined hydraulic pressure state in the cleaning device, the distributor is moved or adjusted into the bypass position or into the shut-off position, in the respective position liquid being conveyed into the distributing device by the liquid-conveying pump or conveying pump at a settable pump reference rotational speed.

In the bypass position, in which the distributor forms the bypass, a first, minimum pressure level is generated in the cleaning device, whereas, in the shut-off position, a second, maximum pressure level is generated in the cleaning device.

In these two reference positions (bypass position; shut-off position), the respective pressure state is detected and is stored for diagnostic purposes as a reference value for an associated fault situation in a memory of a control unit.

Here, the distributor is moved or adjusted firstly into the bypass position and subsequently into the shut-off position or vice versa.

It is proposed here that a rotatably adjustable distributor is adjusted or rotated. Here, the distributor is a purely rotatably adjustable distributor or a distributor with purely rotational action.

It is furthermore proposed here that the method is initiated or carried out at defined time intervals in order to update the reference values.

Here, the two pressure states may be detected by a dedicated pressure sensor downstream of the conveying pump and/or by the conveying pump itself—that is to say without the use of sensors—by virtue of the conveying pump current and/or the conveying pump voltage, which correlate with the pressure state, being picked off.

Here, the method may expediently be carried out in a shut-down and/or parked vehicle.

The invention will be discussed in detail below with reference to a single schematic FIGURE. Further advantageous developments of the invention are apparent from the description below of preferred embodiments.

BRIEF DESCRIPTION OF THE DRAWINGS

In this respect:

FIG. 1 shows a hydraulic circuit diagram of a cleaning device having a proposed water-distributing mechanism.

DETAILED DESCRIPTION OF THE PREFERRED EMBODIMENTS

The following description of the preferred embodiment(s) is merely exemplary in nature and is in no way intended to limit the invention, its application, or uses.

Here, the cleaning device 2 illustrated in FIG. 1 is based on a further development of the water-distributing mechanism described in the German patent application with the application file reference DE 10 2021 208 930.5.

Specifically, FIG. 1 describes a cleaning device 2 for a vehicle for cleaning a multiplicity of cleaning locations RS1, . . . , RS10 on the vehicle.

Here, the cleaning device 2 includes a liquid-distributing actuator with a distributing device 4 and with an electric motor—not illustrated here—for driving a purely rotatably adjustable distributor 6 of the distributing device 4.

Here, the distributing device 4 supplies a pressurized liquid to the individual cleaning locations RS1, . . . , RS10 of the vehicle. Here, the distributing device 4 defines individual positions $P_1$, . . . , $P_{10}$, $P_{11}$, $P_{12}$ into which the distributor 6 is selectively adjustable relative to a housing 8 in which the distributor is arranged and driveable purely in rotation, rotatably adjustable. Here, the distributor 6 is formed without a seal with respect to the housing 8. Therefore, the distributing device 4 is configured for a liquid return—via a return line R—into the tank 18, out of which the liquid is conveyed by a conveying pump 14—and expediently via a filter 16. Here, the conveying pump 14 may, for space and structural space reasons, be arranged at any location on the vehicle. Alternatively, the conveying pump 14 may also form a coherent unit with the housing 8, if the space or structural space conditions in the vehicle allow this.

In the individual distributing positions $P_1$, . . . , $P_{10}$, the distributor 6 fluidically connects a single feed connector $A_Z$, which is subjected to liquid pressure, of the distributing device 4 to one of multiple discharge connectors $A_{RS1}$ to $A_{RS10}$ of the distributing device 4, wherein the individual discharge connectors $A_{RS1}$ to $A_{RS10}$ are fluidically connected via an associated line to an associated nozzle $D_1$, . . . , $D_{10}$.

Here, the discharge connectors $A_{RS1}$, $A_{RS2}$, $A_{RS3}$, $A_{RS4}$ and $A_{RS7}$, $A_{RS8}$, $A_{RS9}$, $A_{RS10}$ are each additionally equipped with a check valve RV1, RV2, RV3, RV4, RV7, RV8, RV9, RV10 in order to prevent emptying of the housing 8.

The lines leading to the nozzles $D_1$, . . . , $D_4$ are in this case situated by way of example below the level of the tank 18, such that the liquid situated in the housing 8, or the liquid situated in the respective lines upstream of the respective check valve, cannot flow out via the associated lines and nozzles $D_1$, . . . , $D_4$ into the surroundings (siphon effect). The check valves RV1, RV2, RV3, RV4 are furthermore preloaded by a respective spring. The check valves RV1, RV2, RV3, RV4 thus prevent an undesired outflow of liquid into the surroundings of the cleaning device 2.

By contrast, the lines leading to the nozzles $D_7$, . . . , $D_{10}$ are, by way of example, situated in this case above the level of the tank 18. The check valves RV7, RV8, RV9, RV10 thus prevent the liquid in the lines from being able to flow back into the housing 8 owing to gravitational force and thus also being able to force the liquid in the housing 8 via the return line R into the tank 18. The check valves RV7, RV8, RV9, RV10 thus prevent an undesired backflow of liquid in the associated lines into the housing 8.

By contrast to this, it is for example the case that the lines leading to the nozzles $D_5$, $D_6$ do not require any such fluidic safeguarding or shut-off device.

At this juncture, reference is expressly made once again to the German patent application with the application file reference DE 10 2021 208 930.5, which describes the electric-motor-operated liquid-distributing actuator and the water-distributing mechanism thereof in detail and furthermore in terms of their construction, these hereby furthermore being expressly incorporated into the content of disclosure of this FIGURE description.

By contrast to the patent application DE 10 2021 208 930.5, however, the distributing device 4 described here has been modified or further developed so as to additionally include a bypass position $P_{11}$ and a shut-off position $P_{12}$.

In the bypass position $P_{11}$, the distributor 6 forms a bypass for preventing a discharge of the liquid to one of the cleaning locations RS1, . . . , RS10 and for returning the liquid to the tank 18. Here, the liquid is discharged via the discharge connector $A_{11}$ into the line 10, which in turn transitions or opens into the return line R to the tank 18. Alternatively, the line 10 may also lead directly into the tank 18, circumventing the return line R.

By contrast, in the shut-off position $P_{12}$, both the discharge and the return are prevented.

In one embodiment, the line 10 opens into a device 12 in the form of a UV radiation unit, which serves for cleaning the liquid or eliminating bacteria from the liquid and which is likewise activatable selectively and in accordance with demand.

In a further embodiment, the line 10 opens into a device 12 in the form of a heat exchanger, which serves for warming the liquid and which may be activatable selectively and in accordance with demand.

In a further embodiment, the liquid flows both through the UV radiation unit and through the heat exchanger.

Both the UV radiation unit and the heat exchanger may in this case be arranged, in accordance with the respective space or structural space conditions in a vehicle, at a correspondingly expedient location of the cleaning device.

A method for operating the above-described cleaning device is described below.

In order to generate a defined hydraulic pressure state in the cleaning device 2, the distributor 6 is rotated or adjusted firstly into the bypass position $P_{11}$ and subsequently into the shut-off position $P_{12}$ or vice versa, in the respective position $P_{11}$, $P_{12}$ liquid being conveyed into the distributing device 4 by the conveying pump 14 at a settable pump reference rotational speed $n_{ref}$.

In the bypass position $P_{11}$, in which the distributor 6 forms the bypass, a first, minimum pressure level pmin is generated in the cleaning device 2, whereas, in the shut-off position $P_{12}$, a second, maximum pressure level pmax is generated in the cleaning device 2.

In both positions, the respective pressure state is detected and is stored for diagnostic purposes as a reference value—for pmin and pmax respectively in relation to $n_{ref}$—in a memory of a control unit.

The maximum pressure level pmax—caused by the shut-off position $P_{12}$—corresponds here to a possible first fault situation in the form of a blocked or clogged nozzle $D_1, \ldots, D_{10}$, whereas the minimum pressure level pmin—caused by the bypass position $P_{11}$—corresponds to a possible second fault situation in the form of an open line, for example in the form of a line which is open in the region of one of the cleaning locations RS1, . . . , RS10, for example owing to a nozzle $D_1, \ldots, D_{10}$ having fallen off or broken away.

It is proposed here that this method for ascertaining the reference values be initiated and carried out in a shut-down and/or parked vehicle, for example during a workshop visit. It is furthermore proposed here that the reference values be repeatedly newly detected at defined time intervals and that the storage thereof in the control unit be updated, especially since such a cleaning device 2 may exhibit certain aging characteristics that may have an effect on the reference values.

Here, the two pressure states pmin, pmax may be detected by a dedicated pressure sensor and/or by the conveying pump itself, that is to say without the use of sensors, for example by way of the conveying pump current I, which may be picked off, and/or the conveying pump voltage U, which may be picked off.

The two fault situations may thus be identified at any time during operation of the vehicle or during a driving cycle by way of a comparison of presently detectable or detected pressure states in the cleaning device 2 with the two reference values stored in the control unit. The present pressure states are in this case analogously also detectable by the dedicated pressure sensor and/or by way of the delivery pump itself, without the use of sensors.

The bypass position $P_{11}$ may furthermore be used for the cleaning of the liquid by virtue of the liquid being circulated in a circuit for a definable time or time period and, in the process, as described above, being irradiated at a definable location of the cleaning device 2 with UV light for the purposes of eliminating bacteria.

In addition or alternatively, the bypass position $P_{11}$ may also be used for warming the liquid circulated in the circuit by virtue of a heat exchanger being flowed through at a definable location of the cleaning device 2.

In order to save costs, it is proposed here that the distributor 6 be used without a dedicated position sensor which monitors or detects the position of the distributor 6 relative to the housing 8.

Rather, for the initialization of the cleaning device 2, it is proposed that the distributor 6 be rotated from one position into another position—in continuous or stepped fashion—until either the bypass position $P_{11}$ (pmin) or the shut-off position $P_{12}$ (pmax) is positively identified. The identification of one of these two positions is sufficient here in order to be able to positively identify or detect the orientation of the distributor 6 relative to the housing 8 and then operate the cleaning device 2 correspondingly.

Here, "initialization" is to be understood to mean the preparation of the cleaning device 2 such that it may commence operation in accordance with its intended use.

Although exemplary embodiments are explained in the above description, it should be noted that numerous modifications are possible. It should be noted, furthermore, that the exemplary embodiments are merely examples which are in no way intended to limit the scope of protection, the applications, and the structure. Instead, the above description gives a person skilled in the art a guideline for the implementation of at least one exemplary embodiment, wherein various changes may be made, especially with regard to the function and arrangement of the integral parts described, without departing from the scope of protection as it is apparent from the combinations of features equivalent thereto.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A distributing device for supplying pressurized liquid to individual cleaning locations of a vehicle, the distributing device comprising:

a housing;

a distributor arranged and drivable within the housing;

a feed connector;

a plurality of discharge connectors; and a plurality of individual positions into which the distributor is selectively adjustable relative to the housing, the plurality of individual positions further comprising:

individual distributing positions, in which the distributor fluidically connects the feed connector, which is subjected to liquid pressure, to one of the plurality of discharge connectors;

a bypass position, in which the distributor forms a bypass for preventing a discharge of the liquid to one of the cleaning locations and for returning the liquid to a tank;

or a shut-off position, which prevents both the discharge and the return;

wherein the distributing device is part of a cleaning device configured to generate a defined hydraulic pressure state in the cleaning device by adjusting the distributor into the bypass position or into the shut-off position, such that in the respective position liquid is conveyed into the distributing device by a conveying pump at a settable pump reference rotational speed;

generate a first, minimum pressure level being in the cleaning device when the distributor is in the bypass position;

generate a second, maximum pressure level in the cleaning device when the distributor is in the shut-off position;

detect and store the minimum pressure level and the maximum pressure level for diagnostic purposes as reference values in a memory of a control unit.

2. The distributing device of claim 1, wherein the distributor is rotatably adjustable.

3. The distributing device of claim 1, the distributor being formed without a seal with respect to the housing.

4. The distributing device of claim 1, wherein the distributing device is configured for a liquid return into the tank.

5. The distributing device of claim 4, wherein the return of the liquid via the bypass transitions into the liquid return of the distributing device.

6. A cleaning device for a vehicle for cleaning a multiplicity of cleaning locations on the vehicle, the cleaning device further comprising at least one liquid-distributing actuator, the at least one liquid-distributing actuator further comprising:

a distributing device, further comprising:

a housing;

a distributor arranged and drivable within the housing;

a feed connector;

a plurality of discharge connectors;

a plurality of individual positions into which the distributor is selectively adjustable relative to the housing, the plurality of individual positions further comprising:

individual distributing positions, in which the distributor fluidically connects the feed connector, which is subjected to liquid pressure, to one of the plurality of discharge connectors;

a bypass position, in which the distributor forms a bypass for preventing a discharge of the liquid to one of the cleaning locations and for returning the liquid to a tank;

or a shut-off position, which prevents both the discharge and the return; and an electric motor for driving the distributor;

wherein the cleaning device is configure to a defined hydraulic pressure state in the cleaning device by adjusting the distributor into the bypass position or into the shut-off position, such that in the respective position liquid is conveyed into the distributing device by a conveying pump at a settable pump reference rotational speed;

generate a first, minimum pressure level being in the cleaning device when the distributor is in the bypass position;

generate a second, maximum pressure level in the cleaning device when the distributor is in the shut-off position;

detect and store the minimum pressure level and the maximum pressure level for diagnostic purposes as reference values in a memory of a control unit.

7. The cleaning device of claim 6, further configured to move the distributor into the bypass position; and move the distributor into the shut-off position after the distributor has been moved into the bypass position.

8. The cleaning device of claim 6, further configured to move the distributor into the shut-off position; and move the distributor into the bypass position after the distributor has been moved into the shut-off position.

9. The cleaning device of claim 6, wherein the distributor is a rotatably adjustable distributor, which is adjusted or rotated.

10. The cleaning device of claim 6, further configured to update the reference values at defined time intervals.

11. The cleaning device of claim 6, further configured to provide a dedicated pressure sensor downstream of the conveying pump; detect the minimum pressure level and the maximum pressure level using the dedicated pressure sensor.

12. The cleaning device of claim 6, wherein the cleaning device is operable in a shut-down and/or parked vehicle.

13. A vehicle having a cleaning device of claim 6.

* * * * *